(12) United States Patent
Merritt

(10) Patent No.: US 6,244,135 B1
(45) Date of Patent: Jun. 12, 2001

(54) BICYCLE DRIVE

(76) Inventor: Thomas Merritt, 1985 NE. 147th St., Miami, FL (US) 33181

( * ) Notice: Subject to any disclaimer, the term of this patent is extended or adjusted under 35 U.S.C. 154(b) by 0 days.

(21) Appl. No.: 09/472,493

(22) Filed: Dec. 27, 1999

(51) Int. Cl.$^7$ .......................... B62M 1/10; B62M 21/00
(52) U.S. Cl. ............................ 74/594.2; 74/594.1
(58) Field of Search ................ 74/594.1, 594.2, 74/594.3

(56) References Cited

U.S. PATENT DOCUMENTS

| | | | |
|---|---|---|---|
| 769,594 | * | 9/1904 | Dould .................................. 74/594.1 |
| 4,753,127 | * | 6/1988 | Baumann ............................ 74/594.1 |
| 5,426,997 | * | 6/1995 | Brion .................................. 74/594.1 |

FOREIGN PATENT DOCUMENTS

| | | | | |
|---|---|---|---|---|
| 176493 | * | 4/1905 | (DE) | .................................. 74/594.2 |
| 326493 | * | 5/1903 | (FR) | .................................. 74/594.1 |
| 333787 | * | 12/1903 | (FR) | .................................. 74/594.1 |
| 1444 | * | 1/1904 | (GB) | .................................. 74/594.1 |

* cited by examiner

*Primary Examiner*—Mary Ann Green

(57) ABSTRACT

The bicycle drive mechanism is intended to emulate the behavior of contemporary multiple sprocket bicycle drive mechanisms while comprising far fewer components. In operation force is transmitted to a first drive sprocket which has the capability to absorb much of the inertial load. A second sprocket on the rear wheel of the bicycle is connected by a chain to the first drive sprocket in the usual fashion. Energy stored in the drive sprocket is gradually released as momentum is increased, thereby easing muscle strain upon the rider.

2 Claims, 4 Drawing Sheets

BICYCLE DRIVE

BACKGROUND OF THE INVENTION

1. Field of the Invention

The present invention relates to an improved bicycle drive mechanism, whereby energy transmitted through a pedal crank arm to the mechanism is utilized in a more efficient manner, thereby relieving stress upon the bicycle rider.

2. Description of the Related Art

The bicycle has been a tried and proven method of human powered transportation prior to and throughout the present century. Aside from this fact, in terms of efficiency it is renowned as an engineering feat, elegantly demonstrating the true ingenuity of mankind as a species. With this in mind one must consider it no mere coincidence that experts in this field, Wilbur and Orville Wright, were also the progenitors of manned flight.

An early embodiment of the bicycle employed as a drive mechanism a crank operated first sprocket driving a second sprocket by way of a continues loop roller chain, the second sprocket being affixed to the rear wheel of the bicycle. This basic but common design still enjoys widespread use in our present day. An early improvement to this concept of energy transfer was to employ a multiple gear ratio mechanism within the hub of the smaller driven sprocket thereby allowing the rider a choice of up to three different gear ratios. A relatively recent improvement involves employing a first plurality of drive sprockets of various sizes connected by the roller chain to a second plurality of driven sprockets of various sizes. The chain connecting the two separate sets of sprockets is made to move between any combination of the sprockets by a mechanism known as a derailer. In this manner a larger variety of gear ratios are available, ranging from a very low ratio to a relatively high ratio. Other improvements have served to facilitate the ease of operating the above mentioned mechanisms, or producing the bicycle of lighter stronger alloys and comfort enhancing schemes. All of these types of improvements address efficiency somewhat, but to a lesser degree. However, with all of the prior art improvements in the field of bicycle drive mechanisms, which incidentally are in the public domain, none have yet solved the most basic problem, which is utilizing energy transmitted by human muscle tissue in a most advantageous yet simple manner. The improved bicycle drive mechanism disclosed henceforth will overcome this disadvantage and thereby provide a simple solution long sought in the art.

SUMMARY OF THE INVENTION

It is the object of the present invention to provide a novel bicycle drive mechanism, whereby energy transmitted to the mechanism will be converted to motion in a simple and efficient manner.

It is another object of the invention to provide a bicycle drive mechanism wherein complexity is substantially minimized, thereby producing an economic benefit in construction.

The object of the present invention is fulfilled by providing an apparatus and method for directing the energy transmitted via a pedal crank to a drive sprocket which possesses the ability to store energy. The stored energy is gradually released as momentum increases, thereby reducing muscle strain during the peak load conditions. The apparatus comprises a pedal crankshaft component, a first toothed sprocket, a bearing disposed upon one face of the sprocket, which the crankshaft extends through, and a flat spiral wound torsion spring, otherwise known as a power spring. By affixing the first sprocket to the outer race of the bearing which has its inner race affixed upon the crankshaft, the sprocket and crankshaft are therefore capable of rotating independently of one another. The power spring, of a predetermined torque rating, is secured at a central point to the crankshaft and at an outer point to the first sprocket. The first sprocket is connected by a chain to a second or driven sprocket which is affixed to the rear wheel of the bicycle in the conventional manner. When force is applied upon the crankshaft, energy is first stored in the power spring proportional to the load, then gradually released as inertia is overcome and momentum increases. Any load can be stored in the power spring at any given moment with little strain upon the rider, therefore it is not required for the rear driven sprocket to be smaller than the drive sprocket as is customary in the art. In fact it is entirely possible for the driven sprocket to be of equal size.

Accordingly, the above summarized bicycle drive mechanism is intended to be a simple and cost effective alternative to the complex, high maintenance, and expensive multiple sprocket bicycle drives of contemporary times. Furthermore, it will allow the effect of multiple gear ratios with the use of only one drive sprocket and one driven sprocket, thereby eliminating the disadvantages of the prior art.

BRIEF DESCRIPTION OF THE DRAWINGS

The above and yet other objects of the present invention and the attendant advantages will become more readily apparent by reference to the drawings wherein.

DETAILED DESCRIPTION OF THE INVENTION

Figure 1:
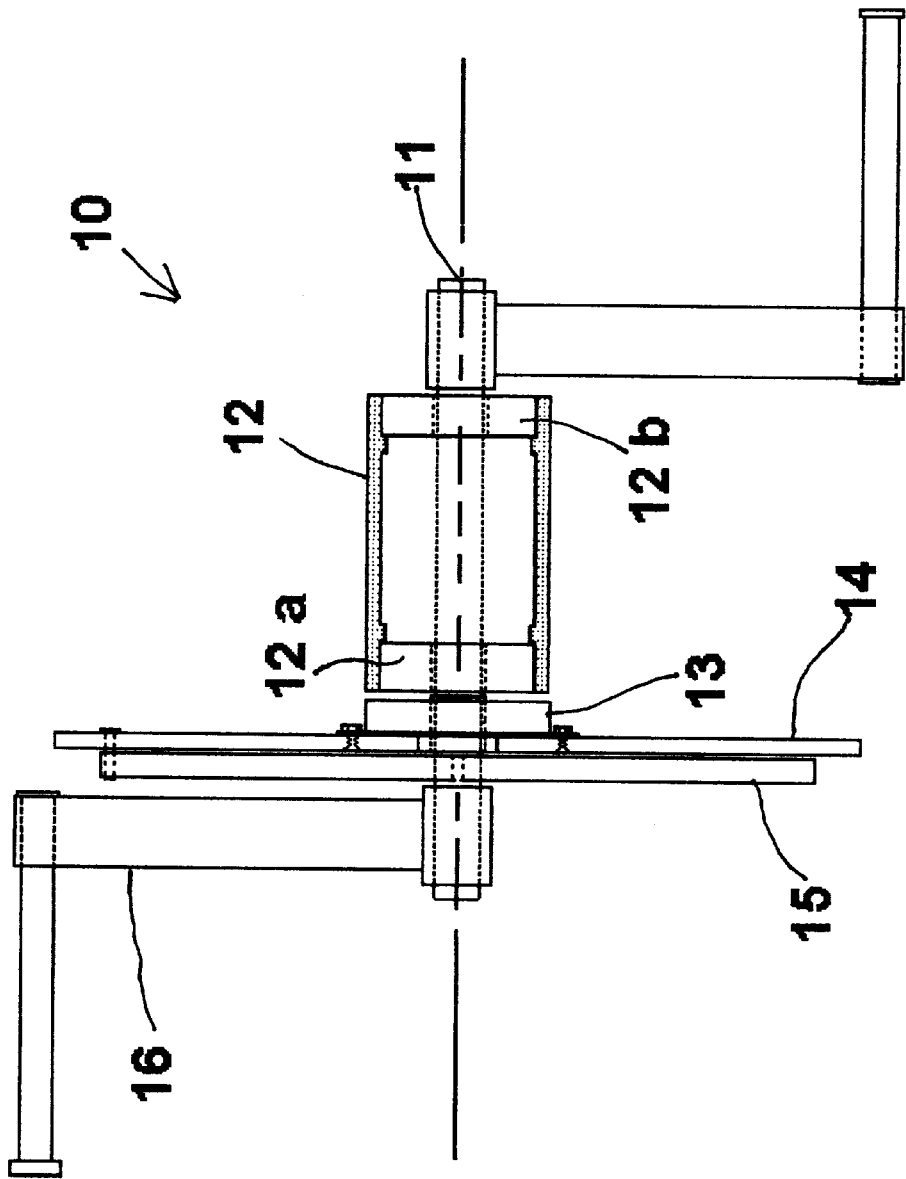
FIG. 1 is a cross sectional view of the present inventive mechanism illustrating the working components.
Figure 2:
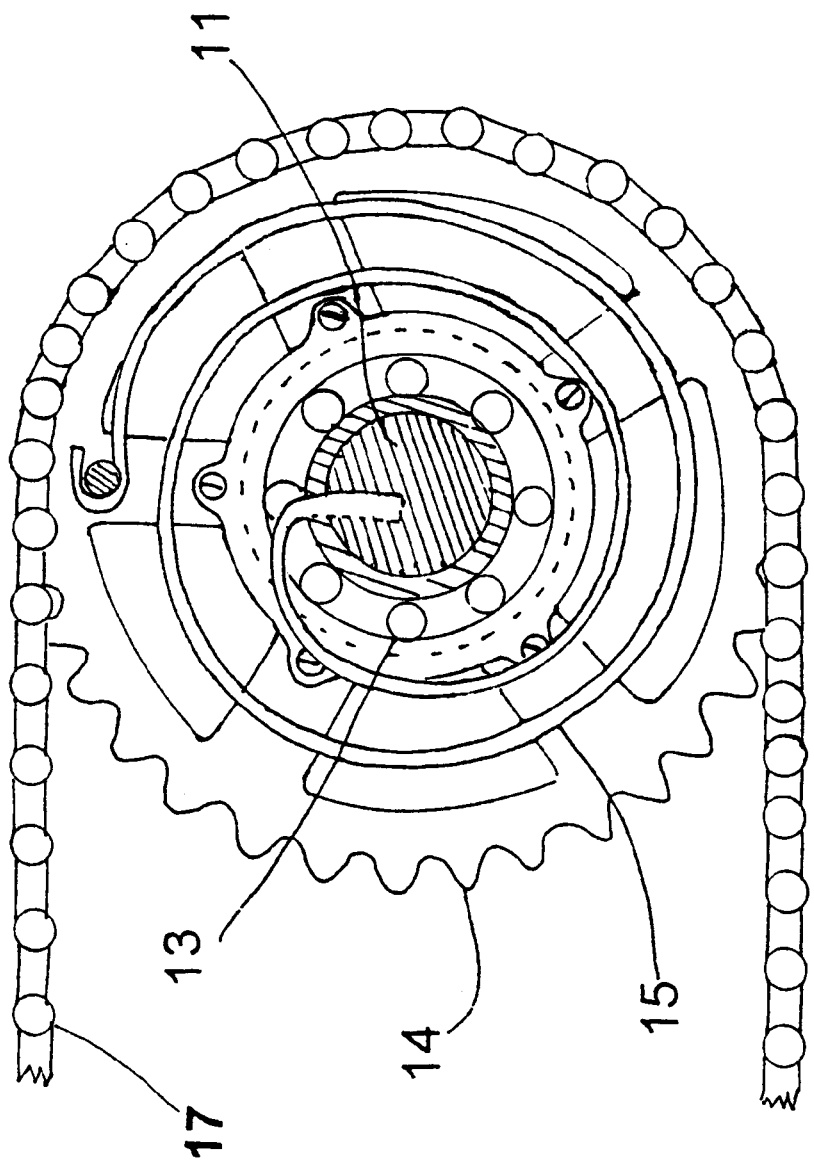
FIG. 2 is a side view of the preferred embodiment of the inventive drive mechanism.
Figure 3:
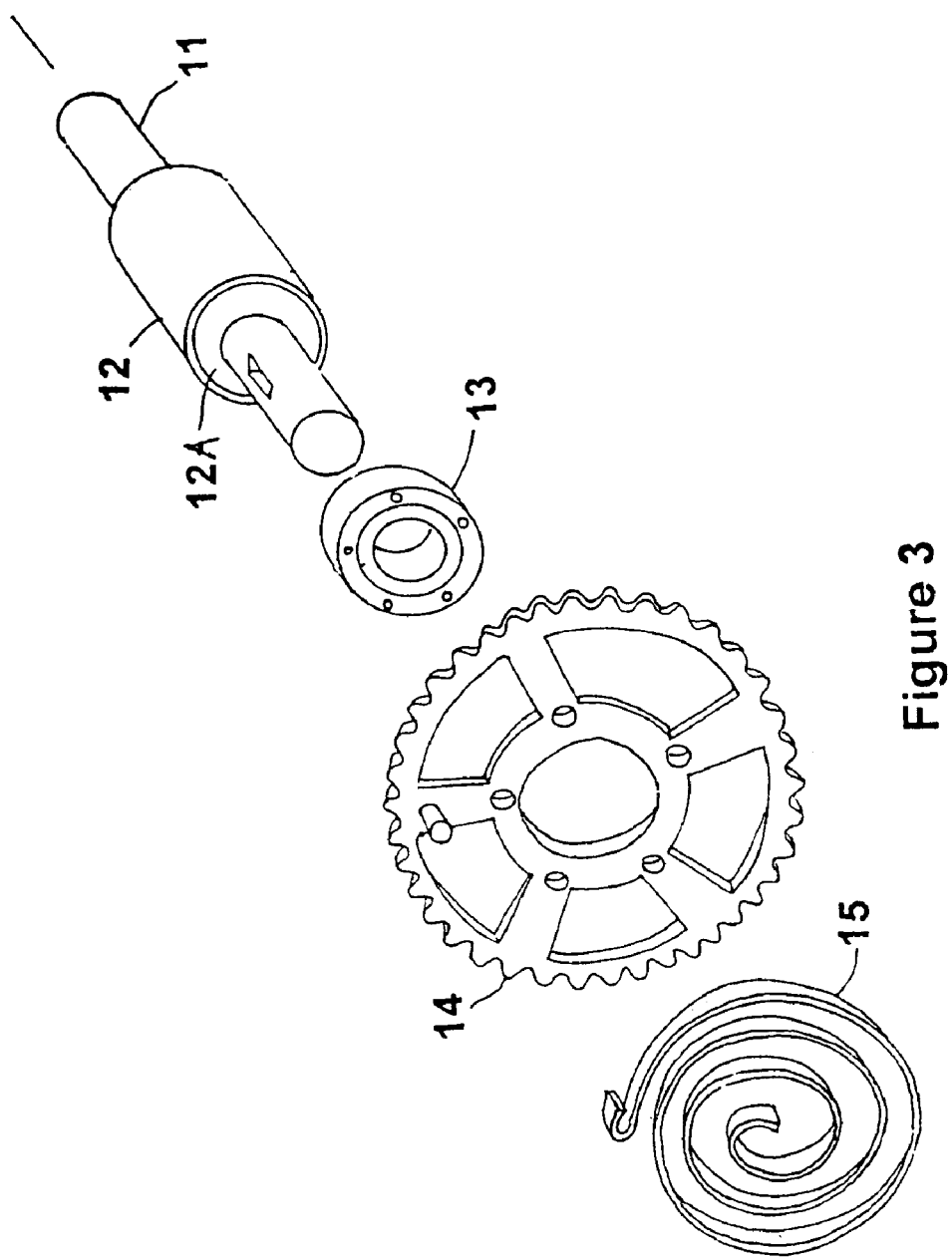
FIG. 3 is an exploded perspective view emphasizing the relative positions of the individual components, as well as the chief distinction between the instant invention and the prior art.
Figure 4:
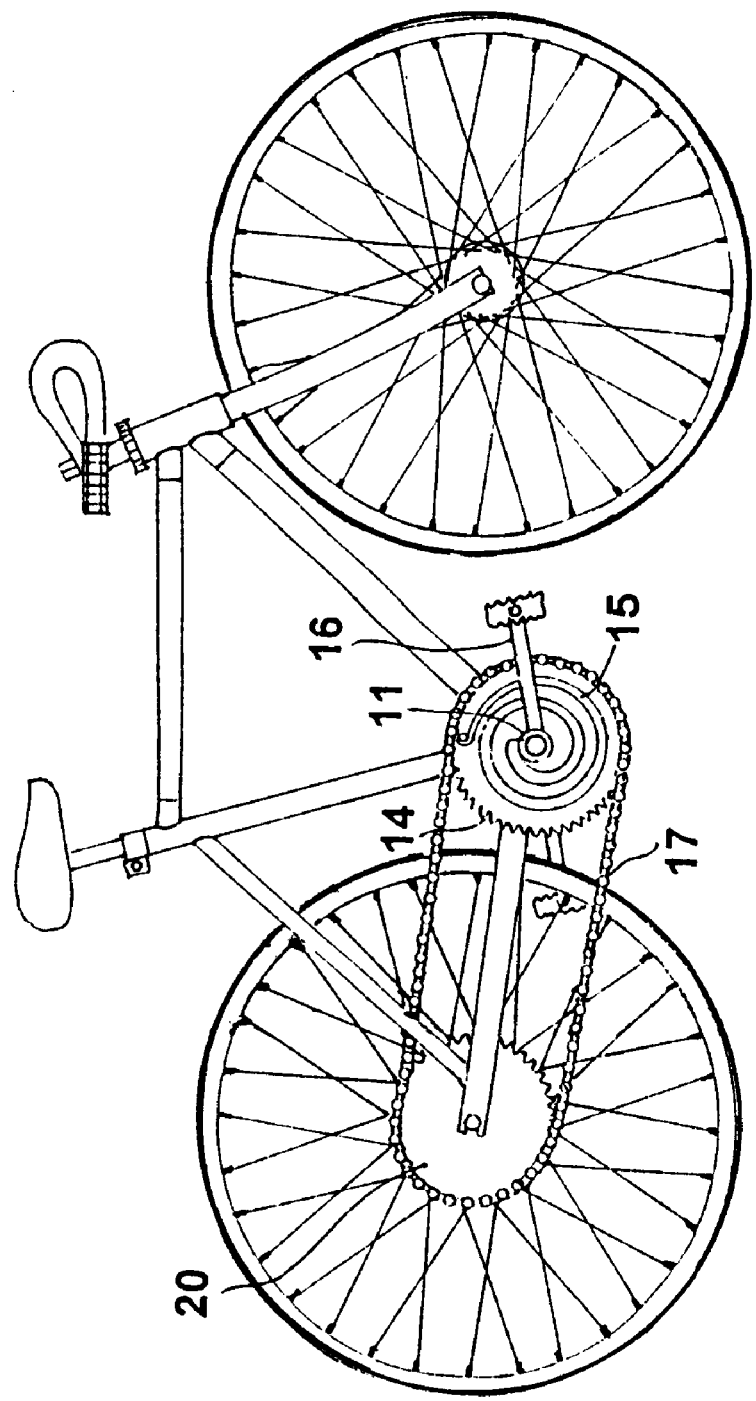
FIG. 4 is another side view of the present inventive mechanism embodied within a complete bicycle.

With reference to FIGS. 1 and 2 which reveal the working components of the inventive mechanism 10, a shaft 11 is disposed axially within and is supported by a first bearing means 12*a* and 12*b* within housing 12. Each distal end of shaft 11 extends a predetermined distance external to housing 12. A second bearing 13, of a known type including an outer and inner race is mounted by the inner race upon shaft 11 externally adjacent to housing 12. A first sprocket 14 having a central void region of greater dimension than the diameter of shaft 11 is centrally affixed about the circumference of the outer race of second bearing 13. Shaft 11 extends completely through the central void region of sprocket 14 making absolutely no contact with the sprocket. Thus, sprocket 14 is mounted upon, but not directly connected to shaft 11 in the normal fashion. This configuration allows sprocket 14 and shaft 11 to rotate independently of one another. Attached to each distal end of shaft 11 is a pedal crank arm 16. A power spring 15 is located adjacent to the face of first sprocket 14 opposite first bearing 13. The power spring is a flat spiral wound spring otherwise known as a torsion spring. Power spring 15 which is of a predetermined torque rating is secured at a first central point to shaft 11 and at a second point is fastened to sprocket 14. In other words it is anchored at one end to shaft 11 while the other end is anchored to sprocket 14. In this fashion the only possible way that energy can be transmitted from pedal crank arm 16 to sprocket 14 is directly through power spring 15. With reference to FIG. 2, pedal crank arm 16 transmits force through shaft 11. Shaft 11 then transmits the force to one end of the power spring 15 thereby causing the spring to transmit a quantity of the energy to sprocket 14 while storing the remaining quantity of the energy. The amount of energy stored or transmitted through power spring 15 is naturally proportional and is entirely dependent upon the load which is present. The load originates at a second sprocket 20 mounted upon the hub of the rear wheel of the bicycle as illustrated in FIG. 4. Sprocket 20 is in physical communication with sprocket 14 via chain 17. The greatest load is when the bicycle is made to move forward from a standing stop, and this load can only be equaled under a complete stall condition. Under the greatest load condition power spring 15 stores a greater proportion of energy than is transmitted through the chain to sprocket 20, but as inertia is overcome and momentum is increased more power is transmitted to sprocket 20 than is stored. The effect upon the rider is a sense of ease of pedaling throughout the momentum change, in essence the sense of smooth seamless acceleration. The necessity of changing gears or moving the chain across sets of sprockets of different dimensions has thereby been completely eliminated.

Accordingly, while a preferred embodiment of the present invention is shown and described herein, it will be understood that the invention may be embodied otherwise than as herein specifically illustrated or described, and that within the embodiments certain changes in the detail and construction, as well as the arrangement of the parts, may be made without departing from the principles of the present invention as defined by the appended claims.

Now that the invention has been described,

What is claimed is:

1. A drive mechanism for a bicycle comprising:

(a) a shaft element of predetermined length, said shaft element axially disposed within a first bearing means, each distal end of said shaft element extending a predetermined distance externally of said bearing means, said bearing means supported within a bearing housing (b) a second bearing means, said second bearing means including an inner bearing race and an outer bearing race, said inner bearing race encompassing and affixed to said shaft element proximate to one of said distal ends of said shaft element (c) a first sprocket, said sprocket possessing a central void region, said shaft element extending through said void region, thereby allowing said sprocket to be affixed against the circumference of said outer race of said second bearing means, thus permitting said first sprocket and said shaft element to rotate independently of one another (d) a spring, said spring positioned parallel, adjacent, and proximate to said sprocket, said spring secured at a first point to said shaft element, said spring secured at a second point to said sprocket, whereby a quantity of energy transmitted by said shaft element to said first sprocket will first reside as potential within said spring.

2. The invention recited in claim 1 further comprising a second sprocket, said second sprocket in communication with said first sprocket, whereby energy originating at said first sprocket will be transmitted to said second sprocket, said second sprocket disposed axially within a bicycle frame.

* * * * *